United States Patent
Rabb et al.

(10) Patent No.: US 10,121,029 B2
(45) Date of Patent: Nov. 6, 2018

(54) LOCATING RADIO ENERGY-PRODUCING TAG

(71) Applicant: Google Inc., Mountain View, CA (US)

(72) Inventors: Laura Rabb, San Jose, CA (US); Kenneth Louis Herman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 56 days.

(21) Appl. No.: 15/281,842

(22) Filed: Sep. 30, 2016

(65) Prior Publication Data
US 2017/0323123 A1 Nov. 9, 2017

Related U.S. Application Data

(60) Provisional application No. 62/332,960, filed on May 6, 2016.

(51) Int. Cl.
  *G06K 7/10* (2006.01)
  *H04W 4/04* (2009.01)
  *G06K 19/07* (2006.01)

(52) U.S. Cl.
  CPC ..... *G06K 7/10128* (2013.01); *G06K 19/0716* (2013.01); *G06K 19/0723* (2013.01); *H04W 4/04* (2013.01)

(58) Field of Classification Search
  CPC .............................. G06K 7/10128; H04W 4/04
  See application file for complete search history.

(56) References Cited

U.S. PATENT DOCUMENTS

| 9,397,522 | B2 * | 7/2016 | Chemishkian | H02J 17/00 |
| 2004/0132461 | A1 * | 7/2004 | Duncan | G01C 21/00 455/456.1 |
| 2004/0178907 | A1 * | 9/2004 | Cordoba | G08B 13/1427 340/539.21 |
| 2005/0093702 | A1 * | 5/2005 | Twitchell, Jr. | G06K 7/10079 340/572.8 |
| 2006/0066444 | A1 * | 3/2006 | Steeves | G06K 7/10108 340/10.5 |
| 2007/0120698 | A1 * | 5/2007 | Turk | G08B 13/1427 340/686.6 |
| 2011/0019562 | A1 * | 1/2011 | Cattuto | G01S 5/0252 370/252 |
| 2013/0234536 | A1 * | 9/2013 | Chemishkian | H02J 17/00 307/149 |
| 2014/0051460 | A1 * | 2/2014 | Dua | H04W 4/02 455/456.1 |

OTHER PUBLICATIONS

Joakim Lindh "Bluetooth® Low Energy Beacons," Application Report SWRA475, Texas Instruments, pp. 13 (Jan. 2015).

* cited by examiner

*Primary Examiner* — Sisay Yacob
(74) *Attorney, Agent, or Firm* — Morris & Kamlay LLP (57) ABSTRACT

Methods and apparatus relating to processing a low-energy data packet are provided. A method includes receiving, using a receiver in a portable wireless device, a low-energy data packet from a low-energy tag. The portable wireless device is stationary. The low-energy data packet includes data identifying the low-energy tag. The method can also include determining at least an approximate distance between the low-energy tag and the portable wireless device. The method can also include transmitting, via an intermediate wireless device and to a central device, the data identifying the low-energy tag, the data identifying the at least approximate distance, or both.

27 Claims, 7 Drawing Sheets

LOCATING RADIO ENERGY-PRODUCING TAG

CLAIM OF PRIORITY

The present Application for Patent claims priority to U.S. Provisional Patent Application No. 62/332,960 entitled "TAG-BASED LOCATING", filed May 6, 2016, and assigned to the assignee hereof and hereby expressly incorporated by reference herein.

BACKGROUND

People lose items. An item which is likely to be lost can be identified as such, and a wireless tag can be attached to the item. Thus, if the item is subsequently lost, the wireless tag can be available to aid in finding the lost item. If a stationary receiver can receive a signal from the wireless tag, the stationary receiver can identify the wireless tag as being in the stationary receiver's range. However, wireless tags have a limited transmission range, and the signal transmitted from the wireless tag may not reach the stationary receiver.

BRIEF SUMMARY

This summary provides a basic understanding of some aspects of the present teachings. This summary is not exhaustive in detail, and is neither intended to identify all critical features, nor intended to limit the scope of the claims.

Methods and apparatus relating to processing low-energy tag data are provided. In an example, a method for processing a low-energy data packet is provided. The method includes receiving, using a receiver in a portable wireless device, a low-energy data packet from a low-energy tag. The portable wireless device is stationary. The low-energy tag can be a Bluetooth®-compatible low-energy tag. The low-energy data packet includes data identifying the low-energy tag. The method can also include determining at least an approximate first distance between the low-energy tag and the portable wireless device. The method can also include transmitting, via an intermediate wireless device and to a central device, the data identifying the low-energy tag, data identifying the at least approximate first distance, or both. The method can include receiving data identifying the low-energy tag and data identifying at least an approximate second distance between the low-energy tag and the intermediate wireless device, as well as include triangulating, using the data identifying the at least approximate first distance and the data identifying the at least approximate second distance, at least an approximate location of the low-energy tag. The method can include receiving a first announcement requesting transmission of a second announcement, where the second announcement requests a response from the low-energy tag. The method can include transmitting the second announcement requesting the response from the low-energy tag. The method can include building an inventory of low-energy tag information, updating the inventory of low-energy tag information, or a combination thereof. The inventory of low-energy tag information can include the data identifying the low-energy tag and the data identifying the at least approximate first distance. Further, the method can include receiving data indicating a room within which the portable wireless device is located, and transmitting, to the central device, the data indicating the room.

In a further example, provided is a non-transitory computer-readable medium, comprising processor-executable instructions stored thereon. The processor-executable instructions are configured to cause a processor to initiate executing one or more parts of the aforementioned method.

In another example, provided is an apparatus. The apparatus includes the portable wireless device. The portable wireless device includes a receiver, a processor coupled to the receiver, and a memory coupled to the processor. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof. The memory is configured to cause the processor to initiate receiving, using the receiver when the portable wireless device is stationary, the low-energy data packet from the low-energy tag. The low-energy tag can be a Bluetooth®-compatible low-energy tag. The low-energy data packet includes the data identifying the low-energy tag. The memory can also be configured to cause the processor to initiate determining at least an approximate first distance between the low-energy tag and the portable wireless device. The memory can be configured to initiate transmitting, via an intermediate wireless device and to the central device, the data identifying the low-energy tag, data identifying the at least approximate first distance, or both. The memory can be further configured to cause the processor to initiate receiving the data identifying the low-energy tag. The memory can be further configured to cause the processor to initiate receiving the data identifying at least an approximate second distance between the low-energy tag and the intermediate wireless device, and to initiate triangulating, using the data identifying the at least approximate first distance and the data identifying the at least approximate second distance, at least an approximate location of the low-energy tag. The memory can be further configured to cause the processor to initiate receiving the first announcement requesting transmission of the second announcement, where the second announcement requests the response from the low-energy tag. The memory can be further configured to cause the processor to initiate transmitting the second announcement requesting the response from the low-energy tag. The memory can be further configured to cause the processor to initiate building the inventory of low-energy tag information, initiate updating the inventory of the low-energy tag information, or a combination thereof. The inventory of the low-energy tag information can include the data identifying the low-energy tag and the data identifying the at least approximate first distance. The memory can be further configured to cause the processor to initiate receiving the data indicating the room within which the portable wireless device is located, and to initiate transmitting, to the central device, the data indicating the room. The intermediate wireless device can be a part of: a camera, a thermostat, a smoke detector, a carbon monoxide detector, or a combination thereof. The intermediate wireless device can be a part of: a mobile device, a computing device, a home automation device, a central remote control base station, an alarm system base station, an alarm system controller, an alarm system sensor, a motion sensor, a door movement sensor, a window movement sensor, a cordless phone base station, a cordless phone, a garage door opener, a door lock, a television, a monitor, a clock radio, a home theatre system, an air conditioner, a lightbulb, a doorbell, a ceiling fan, a switch, an electric outlet, a sprinkler controller, a clothes washer, a clothes dryer, a refrigerator, a microwave oven, a stove, a coffee maker, a blender, or a combination thereof.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings, which are included to provide a further understanding of the disclosed subject matter, are incorporated in and constitute a part of this specification. The drawings also illustrate examples of the disclosed subject matter and together with the detailed description serve to explain the principles of examples of the disclosed subject matter. No attempt is made to show structural details in more detail than are necessary for a fundamental understanding of the disclosed subject matter and various ways in which the disclosed subject matter can be practiced.

In accordance with common practice, features depicted by the drawings may not be drawn to scale. Accordingly, dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are methods and apparatus relating to locating a low-energy tag. A low-energy tag can be placed on an item which can be lost. The low-energy tag wirelessly transmits a low-energy data packet which identifies the low-energy tag. At least an approximate distance between the low-energy tag and a wireless device can be determined from the transmission of the low-energy data packet. However, low-energy tags have a limited transmission range, and the low-energy data packet may not reach a device configured to receive the low-energy data packet. Thus, in an example, provided are wireless devices which are configured to receive the low-energy data packet, process the low-energy data packet, and transmit data relating to the low-energy tag. In examples, the wireless devices can advantageously improve a probability of finding a lost item, improve accuracy of a locating process, and increase a speed of locating the lost item.

Figure 1:
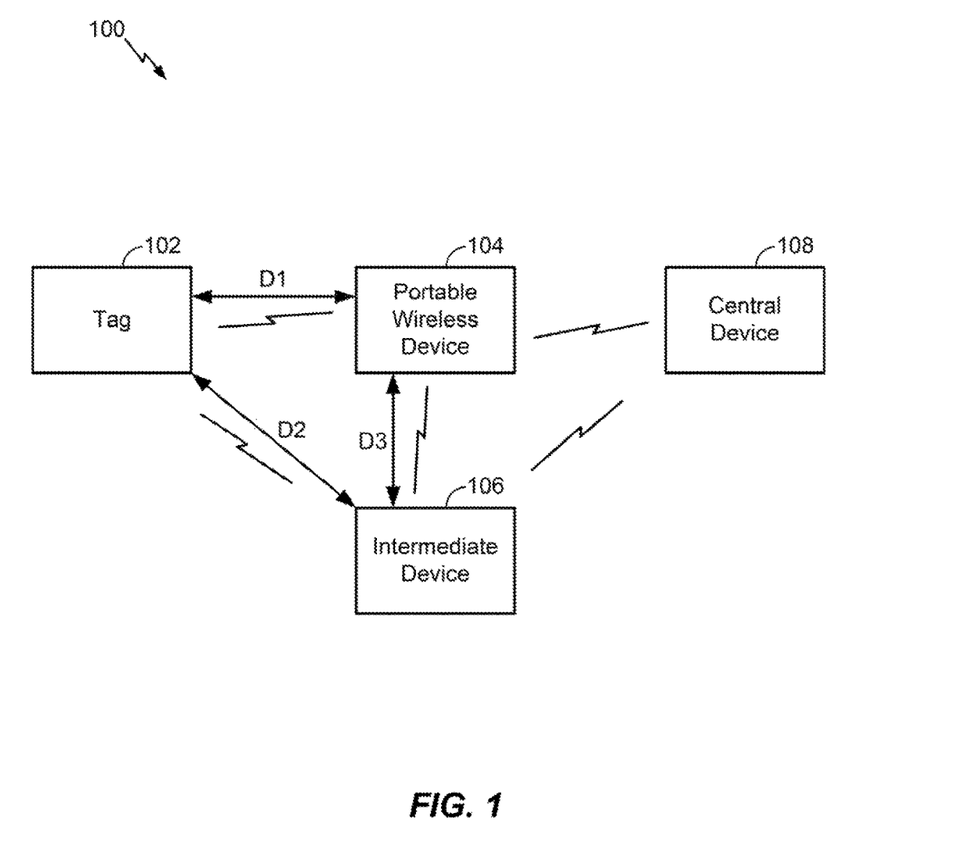
FIG. 1 shows an example communication network, according to an example of the disclosed subject matter.

FIG. 1 and the following description provide an example overview of the disclosed technologies. FIG. 1 shows an example communication network 100. The communication network 100 includes a low-energy tag 102, a portable wireless device 104, an optional intermediate wireless device 106, and an optional central device 108. The portable wireless device 104 and the intermediate wireless device 106 are described in further detail below with regard to FIG. 2. The central device 108 is described in further detail below with regard to FIG. 4.

The low-energy tag 102 can be a portable radio beacon which is configured to wirelessly transmit data, such as the low-energy data packet. The low-energy tag 102 can be attached to a movable item, and can assist in locating the movable item when the movable item is lost. The low-energy tag 102 can be fastened to easily movable items such as, and not limited to, a key, a remote control, a phone, a mobile device, a purse, a wallet, a person, a computer, an animal (e.g., in a collar), a portable asset, sports equipment, the like, a medicine container, or a combination thereof.

The low-energy tag 102 can be a low power consumption device, and can be powered by any of a variety of power sources, including a battery (rechargeable or non-rechargeable), solar power, line power (i.e., main power), converted kinetic energy, power from a computer bus (e.g., a universal serial bus or the like), the like, or a combination thereof. When a battery is implemented as a power source, the low power consumption of the low-energy tag 102 can lead to a relatively long battery life.

The low-energy tag 102 has a low power wireless radio transmitter configured to wirelessly transmit the low-energy data packet to other compatible devices, such as the portable wireless device 104, the intermediate wireless device 106, the central device 108, the like, or a combination thereof. As a result of being a low-power wireless device (e.g., substantially ten dBm radiated power or less), the low-energy tag 102 consumes little power and has a limited wireless transmission range. For example, the wireless transmission range can be less than a few hundred meters. The low-energy tag 102 and the low-energy data packet can be Bluetooth®-compatible. The low-energy data packet can carry information such as synchronization data, timing data, a packet type (e.g., from a connectable device, from a non-connectable device), address data (e.g., a network address), a data payload, tag output power data (which can be used to determine at least a substantial distance to the tag), tag identification data, user-defined data, the like, or a combination thereof.

The portable wireless device 104 can be configured to communicate with other devices in the example communication network 100, such as the low-energy tag 102, the intermediate wireless device 106, the central device 108, the like, or a combination thereof. In examples, the portable wireless device 104 can be a wireless phone, a wireless tablet, a wireless device running iOS® operating system, a wireless device running Android® operating system, the like, or a combination thereof. The portable wireless device 104 can be stationary device.

The portable wireless device 104 can be configured to transmit an announcement requesting a response from the low-energy tag 102. The announcement can be an advertised "find my" tag parameter. In an example, the announcement can be sent in response to receiving a request (e.g., a user request) to locate the low-energy tag 102. In another example, the announcement can be sent when the user is not actively trying to find the low-energy tag 102.

The portable wireless device 104 can be configured to receive, in response to the announcement, information from the low-energy tag 102. The received information can include the low-energy data packet, at least a portion of the data carried within the low-energy data packet, or a combination thereof. The portable wireless device 104 can relay the information received from the low-energy tag 102 to the central device 108. The relaying can be via the intermediate wireless device 106. Using the portable wireless device 104 as a relay device can advantageously enable using the portable wireless device 104 to extend the detection and communication range of the intermediate wireless device 106, and to improve the possibility of establishing and using a communication link with the low-energy tag 102.

The portable wireless device 104 can also be configured to determine data identifying at least an approximate first distance (D1) from the portable wireless device 104 to the low-energy tag 102. The portable wireless device 104 can also be configured to determine data identifying at least an approximate third distance (D3) from the portable wireless device 104 to the intermediate wireless device 106. Further, the portable wireless device 104 can be configured to receive, from one or more other devices (e.g., the intermediate wireless device 106, the central device 108, the like, or a combination thereof) data identifying at least an approximate respective distance (e.g., D2) from one or more other devices (e.g., the intermediate wireless device 106) to the low-energy tag 102, and to triangulate at least an approximate position of the low-energy tag 102 from the distance data. The portable wireless device 104 can also build and/or update an inventory of low-energy tag information including data identifying the low-energy tag 102, distance data, data indicating a room within which the portable wireless device 104 is located, at least an approximate triangulated location of the low-energy tag 102, the like, or a combination thereof. In an example, the portable wireless device 104 can be a Bluetooth®-compatible device.

The intermediate wireless device 106 is a device which can be configured to communicate with other devices in the example communication network 100, such as the low-energy tag 102, the portable wireless device 104, the central device 108, the like, or a combination thereof. In examples, the intermediate wireless device 106 can be a stationary wireless device, such as a home ecosystem device. In examples, the intermediate wireless device 106 can be a portable wireless device, such as wireless phone, a wireless tablet, a wireless device running the iOS® operating system, a wireless device running the Android® operating system, the like, or a combination thereof. The intermediate wireless device 106 can be a portable wireless device which is stationary.

The intermediate wireless device 106 can be configured to relay information from the portable wireless device 104 to the central device 108. The relayable information can include the low-energy data packet, at least a portion of the data carried within the low-energy data packet, the like, or a combination thereof. The intermediate wireless device 106 can be configured to perform at least one function similar to those of the portable wireless device 104. In an example, intermediate wireless device 106 can determine distances, such as the at least approximate second distance D2, the at least approximate third distance D3, the like, or a combination thereof. Thus, the intermediate wireless device 106 can be a fixed location device which locates a portable device that is stationary (e.g., the portable wireless device 104). The intermediate wireless device 106 can be configured to use the portable device to communicate with (e.g., find) the low-energy tag 102. Further, the intermediate wireless device 106 can be configured to transmit tag-related data (e.g., data identifying the at least approximate second distance D2) to the portable wireless device 104. The intermediate wireless device 106 can be configured to receive, from one or more other devices (e.g., the portable wireless device 104, the central device 108, the like, or a combination thereof) data identifying at least an approximate respective distance (e.g., D1) between one or more other devices (e.g., the portable wireless device 104) and the low-energy tag 102, and to triangulate at least an approximate position of the low-energy tag 102 from the distance data. The intermediate wireless device 106 can also build and/or update an inventory of low-energy tag information including data identifying the low-energy tag 102, the distance data, the data indicating a room within which the intermediate wireless device 106 is located, at least an approximate triangulated location of the low-energy tag 102, the like, or a combination thereof. In an example, the intermediate wireless device 106 can be a Bluetooth®-compatible device.

In examples, one or more respective antennas coupled to a device (e.g., including a transmitter, a receiver, a communications circuit, the like, or a combination thereof) described herein can be remotely located from the device. For example, for aesthetic reasons, an antenna can be inconspicuously located in the room, while the device coupled to the antenna is substantially hidden from view of a person in the room.

The central device 108 can be configured to control one or more constituent components of the communication network 100. The central device 108 can receive a user request to locate a tag on a lost item and transmit a request for a response from the low-energy tag 102. The request can be transmitted to the portable wireless device 104, the intermediate wireless device 106, the like, or a combination thereof. In response to the request, the central device 108 can receive distance data identifying respective distances (e.g., D1, D2, D3, the like, or a combination thereof), and can triangulate at least an approximate location of the low-energy tag 102 from the distance data. The central device 108 can also aggregate data relating to one or more tags, so if a tag loses power or has a blocked transmission, then the central device 108 can identify a "last seen" location of the low-energy tag 102. The "last seen" location of the low-energy tag 102 can be at least an approximate location of the low-energy tag 102. The central device 108 can also build and/or update an inventory of low-energy tag information including data identifying the low-energy tag 102, distance data, data indicating the room within which the intermediate wireless device 106 is located, at least an approximate triangulated location of the low-energy tag 102, the like, or a combination thereof.

Figure 2:
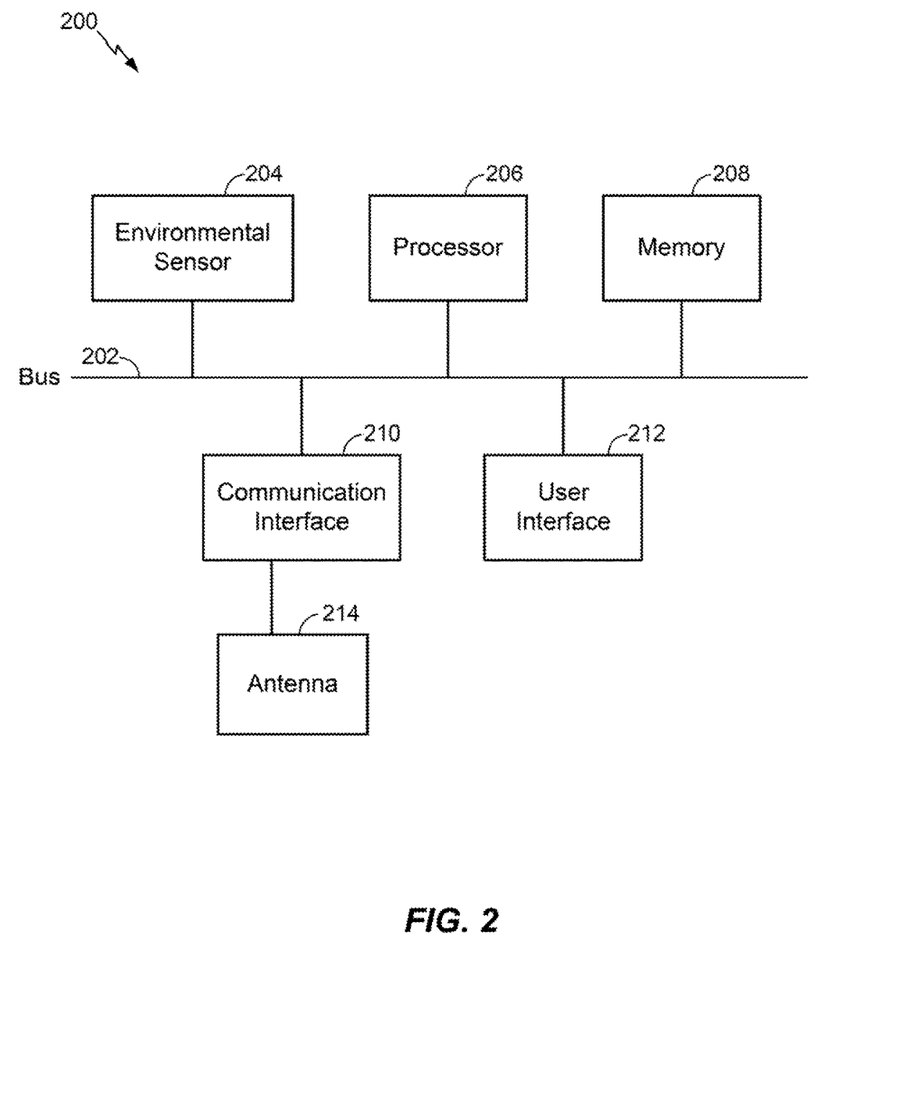
FIG. 2 shows an example wireless device, according to an example of the disclosed subject matter.

FIG. 2 shows an example wireless device 200, such as the portable wireless device 104, the intermediate wireless device 106, or the like. The wireless device 200 can include a bus 202 configured to enable data communication between couple major components of the wireless device 200, such as an optional environmental sensor 204, a processor 206, a memory 208, a communication interface 210, an optional user interface 212, the like, or a combination thereof. One or more components of the wireless device 200 can be implemented in a single physical arrangement, such as where multiple components are implemented on a single integrated circuit.

The example wireless device 200 can be a part of (or include) a portable wireless device, such as phone, a tablet, a device running the iOS® operating system, a device running the Android® operating system, the like, or a combination thereof. In examples, the example wireless device 200 can be a part of (or include) a stationary wireless device such as a phone, a tablet, a camera (e.g., a security camera), a thermostat, a smoke detector, a carbon monoxide (CO) detector, a mobile device, a computing device, a home automation device, a central remote control base station, an alarm system base station, an alarm system controller, an alarm system sensor, a motion sensor, a door movement sensor, a window movement sensor, a cordless phone base station, a cordless phone, a garage door opener, a door lock, a television, a monitor, a clock radio, a home theatre system, an air conditioner, a lightbulb, a doorbell, a ceiling fan, a switch, an electric outlet, a sprinkler controller, a clothes washer, a clothes dryer, a refrigerator, a microwave oven, a stove, a coffee maker, a blender, the like, or a combination thereof.

The environmental sensor 204 is optional, and can be a sensor as described herein. The environmental sensor 204 can be configured to obtain a corresponding type of information about the environment in which the environmental sensor 204 is located.

The processor 206 can be configured to receive and analyze data obtained by the environmental sensor 204, to control operation of other components of the wireless device 200, to process communication between the wireless device 200 and other devices, the like, or a combination thereof. The processor 206 can be configured to execute instructions stored in a memory 208. The processor 206 can be a general purpose processor, an Application Specific Integrated Circuit (ASIC), a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, the like, or a combination thereof.

The memory 208 can be configured to store environmental data obtained by the environmental sensor 204. The memory 208 can be a Random Access Memory (RAM), a Read Only Memory (ROM), flash RAM, a computer-readable storage medium, the like, or a combination thereof.

A communication interface 210, such as a wireless radio (e.g., a Wi-Fi compatible device, a Bluetooth®-compatible device), an Ethernet interface, a local network interface, or the like can be configured to enable communication by the wireless device 200 with other devices. The communication interface 210 can be configured to provide a connection to a remote device (e.g., the low-energy tag 102) via a wireless connection. In an example, the communication interface 210 can provide the wireless connection using any suitable technique and protocol as will be readily understood by one of skill in the art, including digital cellular telephone, Wi-Fi, Bluetooth®, near-field communications (NFC), the like, or a combination thereof. For example, the communication interface 210 can enable the wireless device 200 to communicate with a computer via one or more local, wide-area, or other communication networks, as described in further detail herein. The communication interface 210 can include a receiver, a transmitter, a transceiver, the like, or a combination thereof. One or more antennas 214 can be coupled to the communication interface 210 to enable the communication interface 210 to engage in wireless communications.

The communication interface 210 can be configured to include one or more of the following wireless transmission configurations. In an example, the communication interface 210 can include a wireless transceiver configured to wirelessly couple the portable wireless device 104 to the low-energy tag 102, the intermediate wireless device 106, the central device 108, the like, or a combination thereof. In an example, the communication interface 210 can include a wireless transceiver configured to wirelessly couple the intermediate wireless device 106 to the portable wireless device 104, the low-energy tag 102, the central device 108, the like, or a combination thereof.

The wireless device 200 can be configured to determine at least an approximate distance from the wireless device 200 to the low-energy tag 102. The at least approximate distance can be determined from data indicating a received signal strength of a radio frequency (RF) signal received from the low-energy tag 102. The wireless device 200 can use the data indicating the received signal strength to determine the distance by comparing the data indicating the received signal strength to a look-up table, executing a distance determining algorithm, the like, or a combination thereof.

An optional user interface (UI) 212 can provide information to and/or receive input from a user of the wireless device 200. The UI 212 can be configured to couple to one or more controllers. The UI 212 can be configured to couple to one or more user input devices, such as a keyboard, a pointing device such as a mouse, a touch screen, the like, or a combination thereof. The UI 212 can be configured to receive a request to find a tag (e.g., the low-energy tag 102). The UI 212 can be configured to receive information identifying the room within which the wireless device 200 is located (i.e., a room name—"bedroom," "living room," the like, etc.). The UI 212 can include, for example, a speaker to output an audible alarm when an event is detected by the wireless device 200. The UI 212 can include a light (e.g., a light-emitting diode) configured to be activated when an event is detected by the wireless device 200. The UI 212 can have relatively minimal features (e.g., a limited-output display), or the UI 212 can be a full-featured interface (e.g., a touchscreen). The UI 212 can be configured to display: a distance to a tag, an estimated tag location, a name of a room the tag is in, a tag identification, an indication of successful communication with the central device 108, a receipt of a request to locate the tag, the like, or a combination thereof. The displaying can be performed via a video display.

Figure 3:
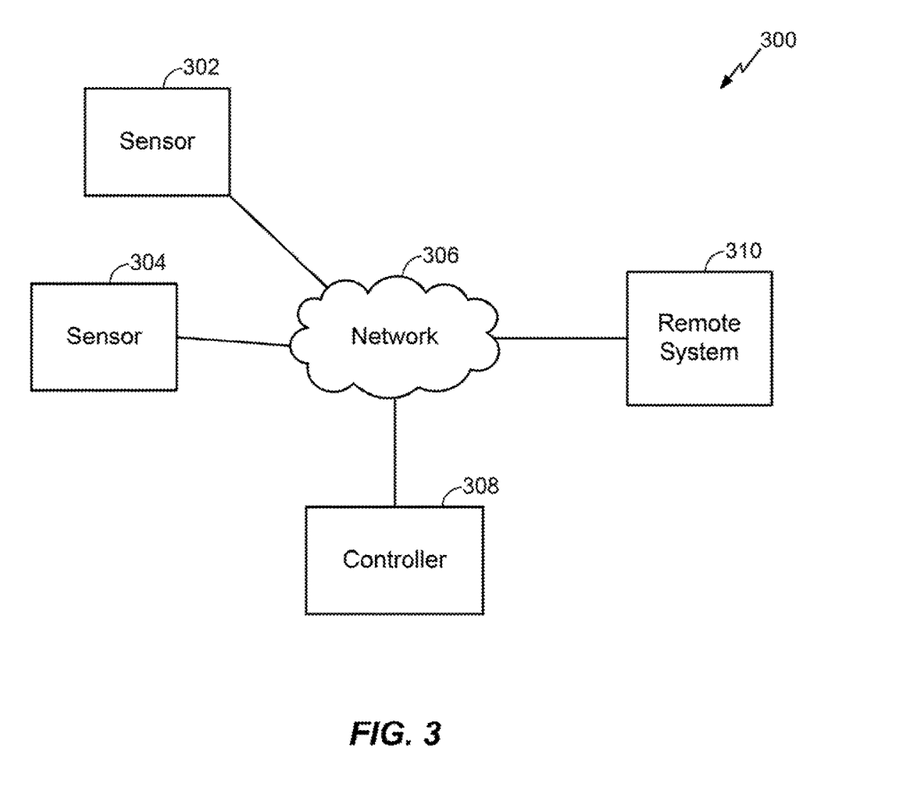
FIG. 3 shows an example of a sensor network, according to an example of the disclosed subject matter.

FIG. 3 shows an example of a sensor network 300. The sensor network 300 can be a home automation network or a portion thereof. In an example, the sensor network 300 can be implemented over any suitable communication network. One or more sensors 302, 304 can communicate via a local network 306, such as a Wi-Fi, Bluetooth, the like, or other suitable network, with each other and/or with the controller 308. In an example, the wireless device 200 can be at least a part of the one or more sensors 302, 304.

In general, a sensor, such as the sensors 302, 304, is any device that can obtain information about the sensor's environment. The sensors 302, 304 can be described by the type of information they collect. Sensor types can include motion, smoke, carbon monoxide, proximity, temperature, time, physical orientation, acceleration, location, entry, presence, pressure, light, sound, and the like. The sensors 302, 304 also can be described in terms of the particular physical device that obtains the environmental information. For example, an accelerometer can obtain acceleration information, and thus can be used as a general motion sensor and/or an acceleration sensor. The sensors 302, 304 also can be described in terms of the specific hardware components used to implement the sensor. For example, a temperature sensor can include a thermistor, thermocouple, resistance temperature detector, integrated circuit temperature detector, or a combination thereof. The sensors 302, 304 also can be described in terms of a function or functions the sensor performs within the sensor network 300, such as a smart home environment. For example, the sensors 302, 304 can operate as a security sensor when the sensor is used to determine security events such as unauthorized entry. The sensors 302, 304 can operate with different functions at different times, such as where a motion sensor is used to control lighting in a smart home environment when an authorized user is present, and is used to alert to unauthorized or unexpected movement when no authorized user is present, or when an alarm system is in an armed state, or the like. In some cases, the sensors 302, 304 can operate as multiple sensor types sequentially or concurrently, such as where a temperature sensor is used to detect a change in temperature, as well as the presence of a person or animal. The sensors 302, 304 also can operate in different modes at the same or different times. The sensors 302, 304 can include multiple sensors or sub-sensors, such as where a position sensor includes both a global positioning sensor (GPS) as well as a wireless network sensor, which provides data that can be correlated with known wireless networks to obtain location information. Multiple sensors can be arranged in a single physical housing, such as where a single device includes movement, temperature, magnetic, and/or other sensors. Such a housing also can be referred to as the sensors 302, 304 or a sensor device. For clarity, sensors are described with respect to the particular functions they perform and/or the particular physical hardware used, when such specification is necessary for understanding of the examples disclosed hereby.

In some configurations, two or more sensors can generate data which can be used by a processor to generate a response and/or infer a state of an environment. For example, an ambient light sensor can determine a light intensity (e.g., darkness) (e.g., less than 60 lux) in a room in which the ambient light sensor is located. A microphone can detect a sound above a set threshold, such as 60 dB. The processor can determine, based on the data generated by both sensors, that the processor should activate all of the lights in the room. In the event the processor only received data from the ambient light sensor, the processor may not have any basis to alter the state of the lighting in the room. Similarly, if the processor only received data from the microphone, it may not make sense to activate the lights in the room because it is daytime or bright in the room (e.g., the lights are already on). As another example, two or more sensors can communicate with one another. Thus, data generated by multiple sensors simultaneously or nearly simultaneously can be used to determine a state of an environment and, based on the determined state, generate a response. In an example, when the sensors 302, 304 includes a wireless device 200, the sensor can detect and interpret a signal from the low-energy tag 102 as described herein.

Sensors can communicate via the communication network 306, such as a conventional wireless network, and/or a sensor-specific network through which sensors can communicate with one another and/or with dedicated other devices. In some configurations one or more sensors can provide information to one or more other sensors, to a controller 308, or to any other device capable of communicating on a network with the one or more sensors. The controller 308 can be general- or special-purpose. In an example, at least a portion of the controller 308 includes the central device 108. For example, one type of controller 308 is that found in a home automation network, collects and analyzes data from one or more sensors within the home. Another example of the controller 308 is a special-purpose controller which is dedicated to a subset of functions, such as a security controller which collects and analyzes sensor data primarily or exclusively as the sensor data relates to various security considerations for a location. The controller 308 can be located locally with respect to the sensors with which the controller 308 communicates and from which the controller 308 obtains sensor data, such as in the case where the controller 308 is positioned within a home that includes a home automation and/or sensor network. Alternatively or in addition, the controller 308 can be remote from the sensors, such as where the controller 308 is implemented as a cloud-based system which communicates with multiple sensors, which can be located at multiple locations and can be local or remote with respect to one another.

The controller 308 can be a general- or special-purpose computer. The controller 308 can, for example, receive, aggregate, and/or analyze environmental information received from the sensors 302, 304. The sensors 302, 304 and the controller 308 can be located locally to one another, such as within a single dwelling, office space, building, room, or the like, or they can be remote from each other, such as where the controller 308 is implemented in the remote system 310 such as a cloud-based reporting and/or analysis system. Alternatively or in addition, sensors can communicate directly with the remote system 310. The remote system 310 can, for example, aggregate data from multiple locations, provide instructions, provide software updates, and/or provide aggregated data to the controller 308 and/or the sensors 302, 304.

The sensor network 300 can be implemented in a smart-home environment. The smart-home environment can include a structure, a house, office building, garage, mobile home, or the like. Devices in the smart home environment, such as the sensors 302, 304, the controller 308, and the network 306 can be integrated into a smart-home environment that does not include an entire structure, such as an apartment, a condominium, an office space, the like, or a combination thereof. The smart home environment can control and/or be coupled to devices outside of the structure. For example, one or more of the sensors 302, 304 can be located outside the structure, for example, at one or more distances from the structure. One or more of the devices in the smart home environment need not be located within the structure. For example, the controller 308, which can receive input from the sensors 302, 304, can be located outside of the structure. The structure can include a plurality of rooms, separated at least partly from each other via walls. The walls can include interior walls or exterior walls. Each room can further include a floor and a ceiling. Devices, such as the sensors 302, 304, can be mounted on, integrated with, and/or supported by a wall, floor, or ceiling of the structure.

The sensor network 300 can include a plurality of devices, including intelligent, multi-sensing, network-connected devices, which can integrate with each other and/or with a central server or a cloud-computing system (e.g., the controller 308 and/or the remote system 310) to provide home-security and smart-home features. The smart-home environment can include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells can include the sensors 302, 304 shown in FIG. 3.

As another example, a smart doorbell can control doorbell functionality, detect a person's approach to or departure from a location (e.g., an outer door to the structure), and announce a person's approach or departure from the structure via audible and/or visual message output by a speaker and/or a display coupled to, for example, the controller 308.

In some examples, the sensor network 300 can include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs can be or include one or more of the sensors 302, 304 shown in FIG. 3. A smart wall switch can detect ambient lighting conditions, and control a power and/or dim state of one or more lights. For example, a sensor such as sensors 302, 304, can detect ambient lighting conditions, and a device such as the controller 308 can control the power to one or more lights (not shown) in the smart-home environment. Smart wall switches can also control a power state or speed of a fan, such as a ceiling fan. For example, sensors 302, 304 can detect the power and/or speed of a fan, and the controller 308 can adjust the power and/or speed of the fan, accordingly. Smart wall plugs can control supply of power to one or more wall plugs (e.g., such that power is not supplied to the plug if nobody is detected to be within the smart-home environment). For example, one of the smart wall plugs can control supply of power to a lamp (not shown).

In examples of the disclosed subject matter, a smart-home environment can include one or more intelligent, multi-sensing, network-connected entry detectors (e.g., "smart entry detectors"). Such detectors can include one or more of the sensors 302, 304 shown in FIG. 3. The illustrated smart entry detectors (e.g., the sensors 302, 304) can be located near one or more windows, doors, and other entry points of the smart-home environment for detecting when a window, door, or other entry point is opened, broken, breached, and/or compromised. The smart entry detectors can generate a corresponding signal to be provided to the controller 308 and/or the remote system 310 when a window or door is opened, closed, breached, and/or compromised. In some examples of the disclosed subject matter, the alarm system, which can be included with the controller 308 and/or coupled to the network 306 may not arm unless all smart entry detectors (e.g., the sensors 302, 304) indicate that all doors, windows, entryways, and the like are closed and/or that all smart entry detectors are armed.

The smart doorbells, the smart wall switches, the smart wall plugs, the smart entry detectors, the keypads, and other devices of a smart-home environment (e.g., as illustrated as sensors 302, 304 of FIG. 3 can be communicatively coupled to each other via the network 306, and to the controller 308 and/or the remote system 310 to provide security, safety, and/or comfort for a user in the smart home environment).

A user can interact with one or more of the network-connected smart devices (e.g., via the network 306). For example, a user can communicate with one or more of the network-connected smart devices using a computer (e.g., a desktop computer, laptop computer, tablet, or the like) or other portable electronic device (e.g., a smartphone, a tablet, a key fob, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key fob with the smart-home environment (e.g., with the controller 308). Such registration can be made at a central server (e.g., the controller 308 and/or the remote system 310) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

Alternatively, or in addition to registering electronic devices, the smart-home environment can make inferences about which individuals live in the home and are therefore users and which electronic devices are associated with those individuals. As such, the smart-home environment can "learn" who is a user (e.g., an authorized user) and permit the electronic devices associated with those individuals to control the network-connected smart devices of the smart-home environment (e.g., devices communicatively coupled to the network 306), in some examples including sensors used by or within the smart-home environment. Various types of notices and other information can be provided to users via messages sent to one or more user electronic devices. For example, the messages can be sent via email, short message service (SMS), multimedia messaging service (MMS), unstructured supplementary service data (USSD), the like, any other practicable type of messaging services and/or communication protocols, the like, or a combination thereof.

A smart-home environment can include communication with devices outside of the smart-home environment but within a proximate geographical range of the home. For example, the smart-home environment can include an outdoor lighting system (not shown) that communicates information through the communication network 306 or directly to a central server or cloud-computing system (e.g., the controller 308 and/or the remote system 310) regarding detected movement and/or presence of people, animals, and any other objects and receives back commands for controlling the lighting accordingly.

The controller 308 and/or the remote system 310 can control the outdoor lighting system based on information received from the other network-connected smart devices in the smart-home environment. For example, in the event, any of the network-connected smart devices, such as smart wall plugs located outdoors, detect movement at night time, the controller 308 and/or the remote system 310 can activate the outdoor lighting system and/or other lights in the smart-home environment.

In some configurations, the remote system 310 can aggregate data from multiple locations, such as multiple buildings, multi-resident buildings, and individual residences within a neighborhood, multiple neighborhoods, and the like. In general, multiple controllers 308 can provide information to the remote system 310. The multiple controllers 308 can provide data directly from one or more sensors as described, or the data can be aggregated and/or analyzed by local controllers such as the controller 308, which then communicates with the remote system 310. The remote system can aggregate and analyze the data from multiple locations, and can provide aggregate results to each location. For example, the remote system 310 can examine larger regions for common sensor data or trends in sensor data, and provide information on the identified commonality or environmental data trends to each of the multiple controllers 308.

Figure 4:
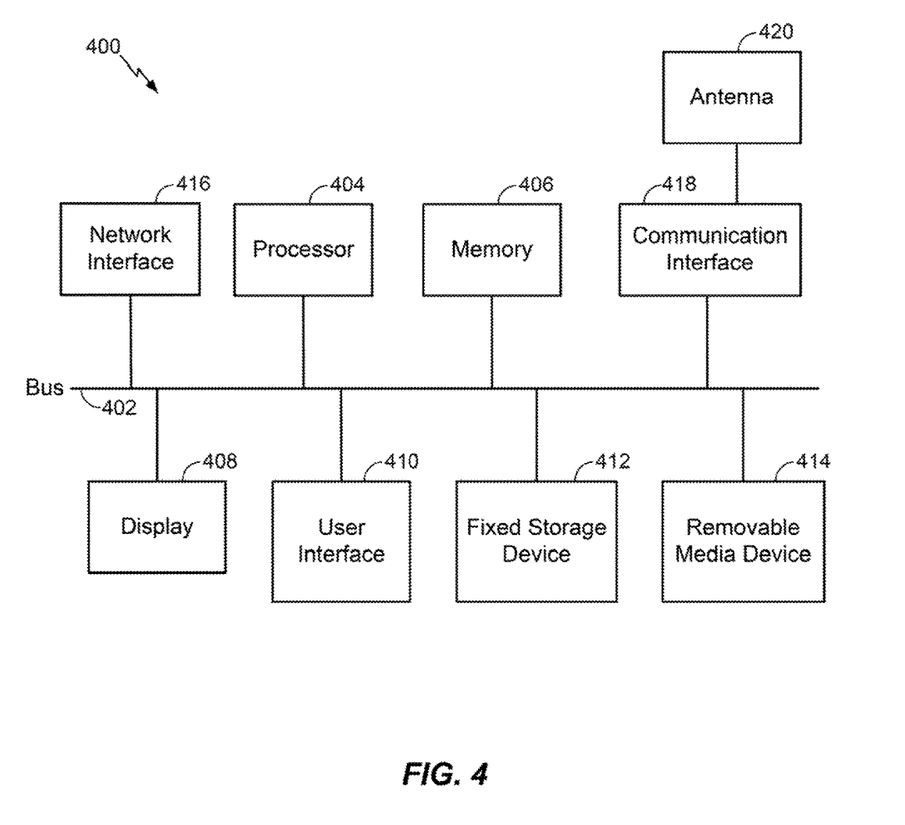
FIG. 4 depicts an example central device, according to an example of the disclosed subject matter.

FIG. 4 depicts an example central device 400. In examples, the central device 400 can be configured as a control device (e.g., as the central device 108, the controller 308, the remote system 310, the like, or a combination thereof). The device 400 can be configured as a device including sensors (e.g., the sensors 302, 304). The device 400 can include a bus 402 configured to enable data communication between couple major components of the device 400, such as the processor 404, a memory 406, a display 408 (such as a display screen), a user interface 410, a fixed storage device 412, a removable media device 414, a network interface 416, a communication interface 418, the like, or a combination thereof.

At least a part of the example central device 400 can be at least a part of a desktop computer, a laptop computer, a camera (e.g., a security camera), a thermostat, a smoke detector, a carbon monoxide (CO) detector, a mobile device, a computing device, a home automation device, a central remote control base station, an alarm system base station, an alarm system controller, an alarm system sensor, a motion sensor, a door movement sensor, a window movement sensor, a cordless phone base station, a cordless phone, a garage door opener, a door lock, a television, a monitor, a clock radio, a home theatre system, an air conditioner, a lightbulb, a doorbell, a ceiling fan, a switch, an electric outlet, a sprinkler controller, a clothes washer, a clothes dryer, a refrigerator, a microwave oven, a stove, a coffee maker, a blender, the like, or a combination thereof.

The processor 404 can be configured to receive and analyze the tag data, to control operation of other components of the central device 400, and process communication between the central device 400 and other devices. The processor 404 can be a general purpose processor, an ASIC, a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, the like, or a combination thereof. In an example, the processor 404 can be configured in a manner at least similar to the processor 206.

The memory 406 can be configured to store the tag data, an inventory of tag data, the environmental data obtained by the environmental sensor 204, the like, or a combination thereof. The memory 406 can be a RAM, a ROM, a flash RAM, a computer-readable storage medium, the like, or a combination thereof.

The user interface 410 can provide information to and/or receive input from a user of the central device 400. The user interface 410 can be configured to couple to one or more controllers. The user interface 410 can be configured to couple to one or more user input devices, such as a keyboard, a mouse, a touch screen, the like, or a combination thereof. The user interface 410 can be configured to receive a request to find a tag (e.g., the low-energy tag 102). The user interface 410 can be configured to receive information identifying a room within which the wireless device 200 is located (e.g., a room name). The user interface 410 can include, for example, a speaker to output an audible alarm when an event is detected by the wireless device 200. The user interface 410 can include a light (e.g., a light-emitting diode) configured to be activated when an event is detected by the wireless device 200. The user interface 410 can have relatively minimal features (e.g., a limited-output display), or the user interface 410 can be a full-featured interface (e.g., a touchscreen). The user interface 410 can be configured to display: a distance (e.g., the at least first approximate distance (D1)) to a tag (e.g., the low-energy tag 102), at least an approximate tag location, a name of a room the tag is in, a tag identification, a receipt of a request to locate the tag, the like, or a combination thereof, via a video display. In examples, the user interface 410 can be integrated with a device other than the central device 400, such as the portable wireless device 104, the intermediate wireless device 106, or a combination thereof.

The fixed storage device 412 can be a hard drive, a flash memory device, the like, or a combination thereof. The fixed storage device 412 can be integral with the device 400 or can be separate and accessed through an interface.

The removable media device 414 can be an optical disk, flash drive, the like, or a combination thereof.

The network interface 416 can be configured to communicate with one or more remote devices (e.g., sensors such as the sensors 302, 304) via a suitable network connection. The network interface 416 can be configured to provide a connection to a remote server via a wired or wireless connection. The network interface 416 can provide the connection using any suitable technique and protocol as will be readily understood by one of skill in the art, including digital cellular telephone, Wi-Fi, Bluetooth®, NFC, the like, or a combination thereof. For example, the network interface 416 can allow the device to communicate with other computers via one or more local, wide-area, or other communication networks, as described in further detail herein.

The communication interface 418, such as a Wi-Fi, Bluetooth, or other wireless interface, Ethernet, or other local network interface, or the like can be configured to enable communication by the device 400 with other devices. The communication interface 418 can be configured to communicate with other devices in the example communication network 100, such as the low-energy tag 102, the portable wireless device 104, the intermediate wireless device 106, the like, or a combination thereof. The communication interface 418 can be configured to provide a connection to a remote device via a wireless connection. The communication interface 418 can provide the connection using any suitable technique and protocol as will be readily understood by one of skill in the art, including digital cellular telephone, Wi-Fi, Bluetooth®, near-field communications (NFC), the like, or a combination thereof. For example, the communication interface 418 can enable the device 400 to communicate with a computer via one or more local, wide-area, or other communication networks, as described in further detail herein. The communication interface 418 can be coupled to one or more antennas 420 to enable the communication interface 418 to engage in wireless communications.

Figure 5:
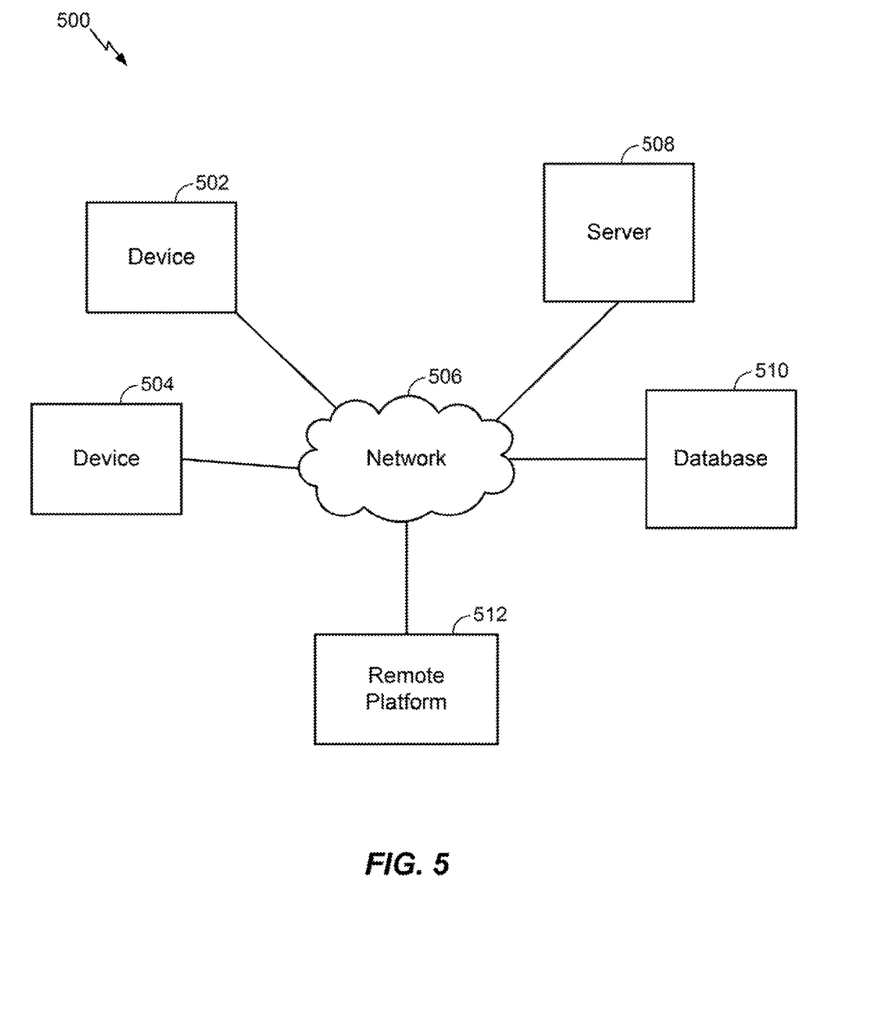
FIG. 5 shows an example network, according to an example of the disclosed subject matter.

FIG. 5 shows an example network 500. The network 500 can include one or more devices 502, 504. The devices 502, 504 can be as a computer, a computing device, a smart phone, a tablet computing device, the like, or a combination thereof. In an example, one or more of the devices 502, 504 can be integrated with the portable wireless device 104, the intermediate wireless device 106, the central device 108, the like, or a combination thereof. In examples, the user interface 410 can be integrated with the one or more devices 502, 504. In an example, one or more of the devices 502, 504 can be coupled to the portable wireless device 104, the intermediate wireless device 106, the central device 108, the like, or a combination thereof. The devices 502, 504 can couple to other devices via one or more networks 506. The network 506 can be a local network, wide-area network, the Internet, or any other suitable communication network or networks. The network 506 can be implemented on any suitable platform including wired and/or wireless networks. The devices 502, 504 can communicate with one or more remote devices, such as the server 508 and/or a database 510. The remote devices, such as a server 508 and/or a database 510 can be directly accessible by the devices 502, 504, or one or more other devices can provide intermediary access such as where the server 508 provides access to resources stored in the database 510. The devices 502, 504 also can access a remote platform 512 to access a service provided by the remote platform 512 such as a cloud computing-based service. The remote platform 512 can include the servers 508 and/or the database 510. The remote platform 512 can be the central device 108.

Figure 6A:
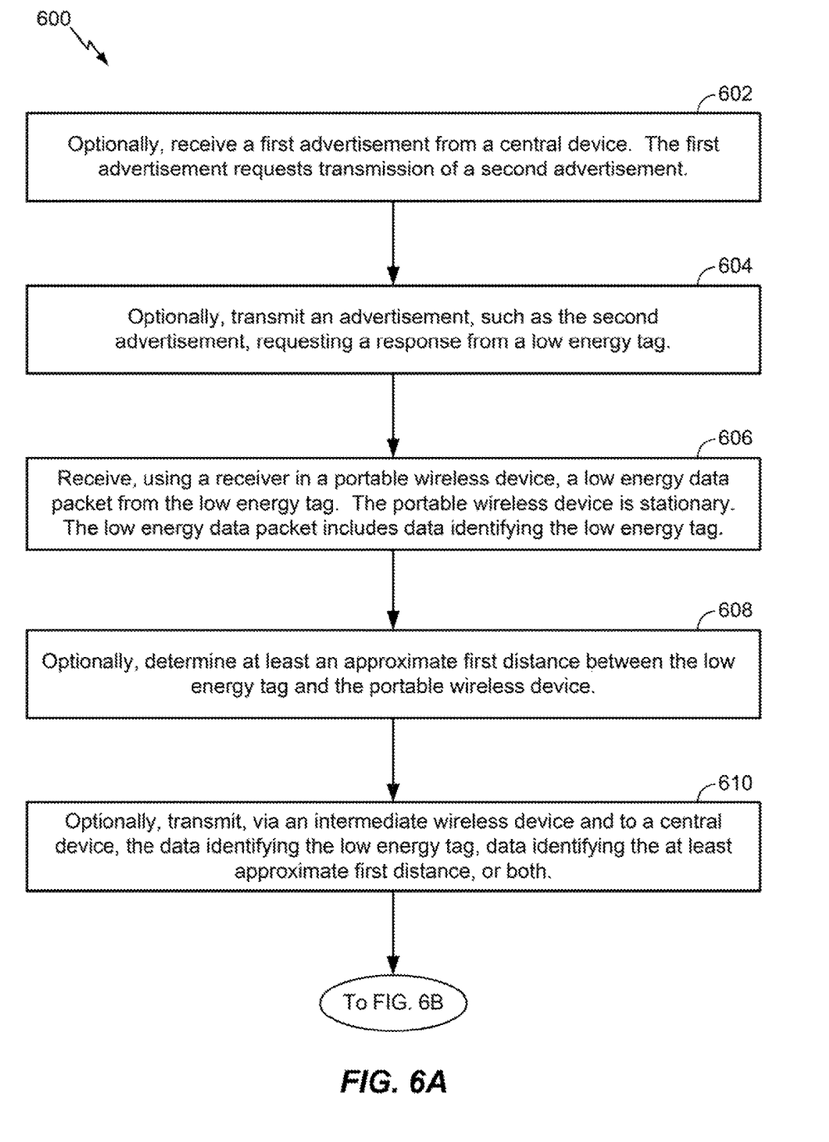
FIGS. 6A and 6B show a flowchart depicting a method for processing a low-energy data packet, according to an example of the disclosed subject matter.
Figure 6B:
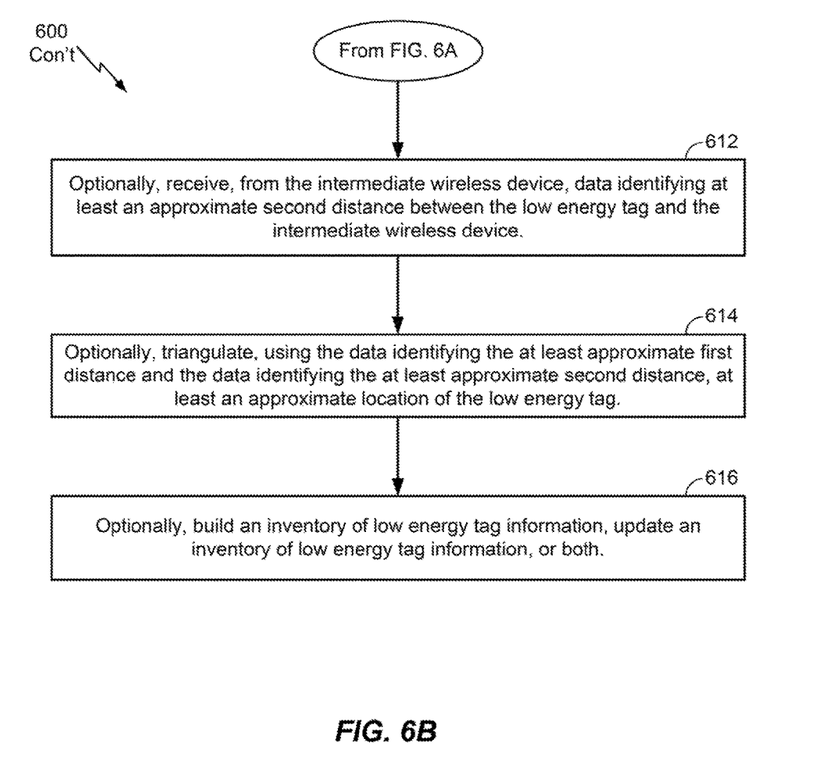

FIGS. 6A and 6B depict a flowchart depicting a method 600 for processing a low-energy data packet. The processor 206, the controller 308, the remote system 310, the processor 404, the server 508, the remote platform 512, the like, or a combination thereof can be configured to initiate performing at least a part of the method 600.

In optional block 602, a first announcement is received by a portable wireless device (e.g., the portable wireless device 104) from a central device (e.g., the central device 108). The portable wireless device can be stationary. The first announcement requests transmission of a second announcement to one or more low-energy tags (e.g., the low-energy tag 102). The second announcement requests a response from the one or more low-energy tags. The first announcement, the second announcement, or both can be an advertised "find my" tag parameter. The one or more of the low-energy tags can be a Bluetooth®-compatible low-energy tag.

In optional block 604, the second announcement requesting the response from the low-energy tag is transmitted from the portable wireless device, the intermediate device (e.g., the intermediate wireless device 106), the central device, the like, or a combination thereof.

In block 606, a low-energy data packet is received, using a receiver in the portable wireless device, from a low-energy tag. The low-energy data packet can be received by the portable wireless device, the intermediate device, the central device, the like, or a combination thereof. The low-energy data packet includes data identifying the low-energy tag (e.g., a tag ID). Data indicating a room within which the portable wireless device is located can also be received and/or retrieved from a memory. The data indicating the room within which the portable wireless device is located can be received and/or retrieved by the portable wireless device, the intermediate device, the central device, the like, or a combination thereof.

In an example, the portable wireless device is stationary, and an input indicating the portable wireless device is stationary can be received to identify that the portable wireless device is stationary. In an example, the portable wireless device can be considered as stationary when the portable wireless device has not moved for at least a threshold period of time. The input can be received, for example, from an accelerometer, a gyroscope, a positioning system (e.g., a global positioning system), the like, or a combination thereof.

In optional block 608, at least an approximate distance (e.g., D1) between the low-energy tag and the portable wireless device can be determined. The at least approximate distance can be determined by comparing a radio-frequency signal strength of the low-energy data packet to a lookup table which cross-references received radio-frequency signal strengths to respective estimated distances. Alternatively, the at least approximate distance can be determined by comparing the received radio-frequency signal strength of the low-energy data packet to one or more threshold radio-frequency signal strength values relating to demarcations between respective ranges of distances.

In optional block 610, the data identifying the low-energy tag, the data identifying the at least approximate first distance (e.g., D1) between the low-energy tag and the portable wireless device, or both is transmitted (e.g., from the portable wireless device, the intermediate device, or both) to the central device. The data indicating the room can be transmitted to the central device. This informs the central device of the presence of the low-energy tag and provides the central device with information which can assist in locating the low-energy tag. The data indicating the at least approximate first distance can be received by the intermediate device, the central device, the like, or a combination thereof. The data indicating the at least approximate first distance can be stored and/or retrieved from a memory in the portable wireless device, a memory in the intermediate device, a memory in the central device, or both.

Optional block 612 relates to triangulating a position of the low-energy tag. The intermediate device can receive one or more low-energy data packets from the low-energy tag. The intermediate device can determine at least an approximate second distance between the low-energy tag and the intermediate device. The intermediate device can then transmit, to the portable wireless device, data indicating the at least approximate second distance. The data indicating the second distance identifies the at least approximate second distance (e.g., D2) between the low-energy tag and the intermediate device. In optional block 612, the data indicating the at least approximate second distance is received. The data indicating the at least approximate second distance can be received by the portable wireless device, the central device, the like, or a combination thereof. The data indicating the at least approximate second distance can be stored and/or retrieved from a memory in the portable wireless device, a memory in the intermediate device, a memory in the central device, or both.

In optional block 614, the data identifying the at least approximate first distance and the data identifying the at least approximate second distance are used to triangulate at least an approximate location of the low-energy tag. Respective distance data from additional intermediate devices can also be used in the triangulation process to increase accuracy and precision of the triangulation.

Optional block 616 relates to recording low-energy tag information to build a "last seen" inventory. The inventory of low-energy tag information can include information such as the data identifying the low-energy tag, the data identifying the at least approximate first distance, the data identifying the at least approximate second distance, dates, times, the like, or a combination thereof. In optional block 616, the inventory of low-energy tag information can be built, updated, or a combination thereof, by the portable wireless device, the intermediate device, the central device, the like, or a combination thereof.

The foregoing blocks are not limiting of the examples. The blocks can be combined and/or the order can be rearranged, as practicable.

The term "example" can mean "serving as an example, instance, or illustration." Any example described as "example" is not necessarily to be construed as preferred over other examples. Likewise, the term "examples" does not require that all examples include the described feature, advantage, or operation. Use of the terms "in one example," "an example," and the like does not necessarily refer to the same example. Use of the terms "in one feature," "a feature," and the like does not necessarily refer to the same feature. Furthermore, a particular feature can be combined with one or more other features. Moreover, a particular structure can be combined with one or more other structures. At least a portion of the apparatus described hereby can be configured to perform at least a portion of a method described hereby.

The terms "connected," "coupled," and variations thereof, mean any connection or coupling between elements, either direct or indirect, and can include an intermediate element between two elements that are "connected" or "coupled" together via the intermediate element. Coupling and connection between the elements can be physical, logical, or a combination thereof. Elements can be "connected" or "coupled" together, for example, by one or more wires, cables, printed electrical connections, electromagnetic energy, the like, or a combination thereof. The electromagnetic energy can have a wavelength at a radio frequency, a microwave frequency, a visible optical frequency, an invisible optical frequency, the like, or a combination thereof, as is practicable. These are non-limiting and non-exhaustive examples.

The term "signal" can include any signal such as a data signal, an audio signal, a video signal, a multimedia signal, an analog signal, a digital signal, the like, or a combination thereof. Information and signals can be represented using any of a variety of different technologies and techniques. For example, data, an instruction, a process step, a process block, a command, information, a signal, a bit, a symbol, the like, or a combination thereof can be represented by a voltage, a current, an electromagnetic wave, a magnetic field, a magnetic particle, an optical field, an optical particle, the like, or any practical combination thereof, depending at least in part on the particular application, at least in part on a desired design, at least in part on corresponding technology, at least in part on like factors, or a combination thereof.

An element referred to as "first," "second," and so forth does not limit either the quantity or the order of those elements. Rather, these designations are used as a convenient method of distinguishing between two or more elements or instances of an element. Thus, a reference to first and second elements does not mean that only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of a group consisting of A, B, and C" can be interpreted as "A or B or C or any combination of these elements." For example, this terminology can include A, or B, or C, or A and B, or A and C, or A and B and C, or 2A, or 2B, or 2C, and so on.

The terminology used herein describes particular examples and is not intended to be limiting. The singular forms "a," "an," and "the" include the plural forms as well, unless the context clearly indicates otherwise. In other words, the singular portends the plural, where practicable. Further, the terms "comprises," "comprising," "includes," and "including" specify a presence of a feature, an integer, a step, a block, an operation, an element, a component, the like, or a combination thereof, but do not necessarily preclude a presence or an addition of another feature, integer, step, block, operation, element, component, and the like.

Further, the example logical blocks, modules, circuits, steps, and the like, as described in the examples disclosed hereby, can be implemented as electronic hardware, computer software, or combinations of both, as is practicable. To clearly illustrate this interchangeability of hardware and software, example components, blocks, modules, circuits, and steps are described herein generally in terms of their functionality. Whether the functionality is implemented as hardware or software depends upon the particular application and design constraints imposed on an overall system. Skilled artisans can implement the described functionality in a manner tailored to a particular application. An implementation should not be interpreted as causing a departure from the scope of the present disclosure.

One or more examples provided hereby can include a non-transitory (i.e., a non-transient) machine-readable media and/or a non-transitory (i.e., a non-transient) computer-readable media storing processor-executable instructions (e.g., special programming) configured to cause a processor (e.g., a special-purpose processor) to transform the processor and any other cooperating devices into a machine (e.g., a special-purpose processor) configured to perform at least a part of a function described hereby and/or a method described hereby. Performing at least a part of a function described hereby can include initiating at least a part of a function described hereby. When implemented on a general-purpose processor, the processor-executable instructions can configure the processor to become a special-purpose device, such as by temporary (and/or permanent) creation of specific logic circuits within the processor, as specified by the instructions. In an example, a combination of at least two related method steps forms a sufficient algorithm. In an example, a sufficient algorithm constitutes special programming. In an example, any software that can cause a computer (e.g., a general-purpose computer, a special-purpose computer, etc.) to be configured to perform one or more function, feature, step algorithm, block, or combination thereof, constitutes special programming. A non-transitory (i.e., a non-transient) machine-readable media specifically excludes a transitory propagating signal. A non-transitory (i.e., a non-transient) machine-readable medium can include a hard drive, a universal serial bus drive, a RAM, a flash memory, a ROM, an erasable programmable read-only memory (EPROM), an electrically erasable programmable read-only memory (EEPROM), a register, a hard disk drive, a removable disk, a compact disc read-only memory (CD-ROM), the like. An example storage medium can be coupled to the processor such that the processor can read information from, and/or write information to, the storage medium. In an example, the non-transitory machine-readable medium can be integrated with a processor.

Further, examples are described in terms of sequences of actions to be performed by, for example, one or more element of a computing device, such as a processor. Examples can be implemented using hardware that can include a processor, such as a general purpose processor and/or an ASIC. Both a general purpose processor and an ASIC can be configured to initiate and/or perform at least a part of the disclosed subject matter. The processor can be coupled to a memory, such as a RAM, a flash memory, a ROM, an EPROM, an EEPROM, the like, or any other device capable of storing electronic information, such as a processor-executable instruction.

The term "mobile device" can describe, and is not limited to: a mobile phone, a mobile communication device, a mobile hand-held computer, a portable computer, a tablet computer, a person-portable wireless device, the like, or a combination thereof.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. This description, for purpose of explanation, includes references to specific examples. However, the illustrative discussions herein (including in the claims) are not intended to be exhaustive or to limit examples of the disclosed subject matter to the precise forms disclosed. Many modifications and variations are possible in view of the teachings herein. The examples are chosen and described in order to explain the principles of examples of the disclosed subject matter and their practical applications, to thereby enable persons skilled in the art to utilize those examples as well as various examples with various modifications as may be suited to the particular use contemplated.

The invention claimed is:

1. A method for processing a low-energy data packet, the method comprising:
   receiving, using a receiver in a portable wireless device, a low-energy data packet from a low-energy tag, wherein the low-energy data packet includes data identifying the low-energy tag;
   determining, by the portable wireless device, at least an approximate first distance between the low-energy tag and the portable wireless device; and
   transmitting, from the portable wireless device via an intermediate wireless device and to a central device, the data identifying the low-energy tag and data identifying the at least the approximate first distance.

2. The method of claim 1, further comprising:
   receiving, by the portable wireless device, the data identifying the low-energy tag and data identifying at least an approximate second distance between the low-energy tag and the intermediate wireless device; and
   triangulating, by the portable wireless device, using the data identifying the at least the approximate first distance and the data identifying the at least the approximate second distance, at least an approximate location of the low-energy tag.

3. The method of claim 1, further comprising receiving, by the portable wireless device, a first announcement requesting transmission of a second announcement, wherein the second announcement requests a response from the low-energy tag.

4. The method of claim 1, further comprising transmitting, from the portable wireless device, an announcement requesting a response from the low-energy tag.

5. The method of claim 1, wherein the low-energy tag is a Bluetooth-compatible low-energy tag.

6. The method of claim 1, further comprising:
   building, by the portable wireless device, an inventory of low-energy tag information;
   updating, by the portable wireless device, the inventory of low-energy tag information; or
   a combination thereof, wherein the inventory of low-energy tag information includes the data identifying the low-energy tag and the data identifying the at least the approximate first distance.

7. The method of claim 1, further comprising:
   receiving, by the portable wireless device, data indicating a room within which the portable wireless device is located; and
   transmitting, from the portable wireless device to the central device, the data indicating the room.

8. The method of claim 1, wherein the receiving is performed when the portable wireless device is stationary.

9. A non-transitory computer-readable medium, comprising:
   instructions stored by the non-transitory computer-readable medium, wherein the instructions are configured to cause a processor of a portable wireless device to:
   initiate receiving, using a receiver in the portable wireless device, a low-energy data packet from a low-energy tag, wherein the low-energy data packet includes data identifying the low-energy tag;
   initiate determining at least an approximate first distance between the low-energy tag and the portable wireless device; and
   initiate transmitting, via an intermediate wireless device and to a central device, the data identifying the low-energy tag and data identifying the at least the approximate first distance.

10. The non-transitory computer-readable medium of claim 9, wherein the instructions are configured to cause the processor to:
    initiate receiving the data identifying the low-energy tag and data identifying at least an approximate second distance between the low-energy tag and the intermediate wireless device; and
    initiate triangulating, using the data identifying the at least the approximate first distance and the data identifying the at least the approximate second distance, at least an approximate location of the low-energy tag.

11. The non-transitory computer-readable medium of claim 9, wherein the instructions are configured to cause the processor to initiate receiving a first announcement requesting transmission of a second announcement, and the second announcement requests a response from the low-energy tag.

12. The non-transitory computer-readable medium of claim 9, wherein the instructions are configured to cause the processor to initiate transmitting an announcement requesting a response from the low-energy tag.

13. The non-transitory computer-readable medium of claim 9, wherein the low-energy tag is a Bluetooth-compatible low-energy tag.

14. The non-transitory computer-readable medium of claim 9, wherein an inventory of low-energy tag information includes the data identifying the low-energy tag and the data identifying the at least the approximate first distance, and wherein the instructions are configured to cause the processor to:
    initiate building the inventory of low-energy tag information;
    initiate updating the inventory of low-energy tag information; or
    a combination thereof.

15. The non-transitory computer-readable medium of claim 9, wherein the instructions are configured to cause the processor to:
    initiate receiving data indicating a room within which the portable wireless device is located; and initiate transmitting, to the central device, the data indicating the room.

16. The non-transitory computer-readable medium of claim 9, wherein the receiving is performed when the portable wireless device is stationary.

17. An apparatus, comprising:
a portable wireless device including:
a receiver;
a processor coupled to the receiver; and
a memory coupled to the processor and configured to cause the processor to:
initiate receiving, using the receiver, a low-energy data packet from a low-energy tag, wherein the low-energy data packet includes data identifying the low-energy tag;
initiate determining at least an approximate first distance between the low-energy tag and the portable wireless device; and
initiate transmitting, via an intermediate wireless device and to a central device, the data identifying the low-energy tag and data identifying the at least the approximate first distance.

18. The apparatus of claim 17, wherein the memory is further configured to cause the processor to:
initiate receiving the data identifying the low-energy tag and data identifying at least an approximate second distance between the low-energy tag and the intermediate wireless device; and
initiate triangulating, using the data identifying the at least the approximate first distance and the data identifying the at least the approximate second distance, at least an approximate location of the low-energy tag.

19. The apparatus of claim 17, wherein the memory is further configured to cause the processor to initiate receiving a first announcement requesting transmission of a second announcement, and the second announcement requests a response from the low-energy tag.

20. The apparatus of claim 17, wherein the memory is further configured to cause the processor to initiate transmitting an announcement requesting a response from the low-energy tag.

21. The apparatus of claim 17, wherein the low-energy tag is a Bluetooth-compatible low-energy tag.

22. The apparatus of claim 17, wherein an inventory of low-energy tag information includes the data identifying the low-energy tag and the data identifying the at least the approximate first distance, and the memory is further configured to cause the processor to:
initiate building the inventory of low-energy tag information;
initiate updating the inventory of low-energy tag information; or
a combination thereof.

23. The apparatus of claim 17, wherein the memory is further configured to cause the processor to:
initiate receiving data indicating a room within which the portable wireless device is located; and
initiate transmitting, to the central device, the data indicating the room.

24. The apparatus of claim 17, wherein the processor is a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

25. The apparatus of claim 17, wherein the intermediate wireless device is a part of:
a camera;
a thermostat;
a smoke detector;
a carbon monoxide detector; or
a combination thereof.

26. The apparatus of claim 17, wherein the intermediate wireless device is a part of:
a mobile device;
a computing device;
a home automation device;
a central remote control base station;
an alarm system base station;
an alarm system controller;
an alarm system sensor;
a motion sensor;
a door movement sensor;
a window movement sensor;
a cordless phone base station;
a cordless phone;
a garage door opener;
a door lock;
a television;
a monitor;
a clock radio;
a home theatre system;
an air conditioner;
a lightbulb;
a doorbell;
a ceiling fan;
a switch;
an electric outlet;
a sprinkler controller;
a clothes washer;
a clothes dryer;
a refrigerator;
a microwave oven;
a stove;
a coffee maker;
a blender; or
a combination thereof.

27. The apparatus of claim 17, wherein the receiving is performed when the portable wireless device is stationary.

* * * * *